Sept. 2, 1952   F. GAVIOLA ET AL   2,609,015
RECIPROCATING POWER-DRIVEN SAW
Filed April 22, 1947   3 Sheets-Sheet 1
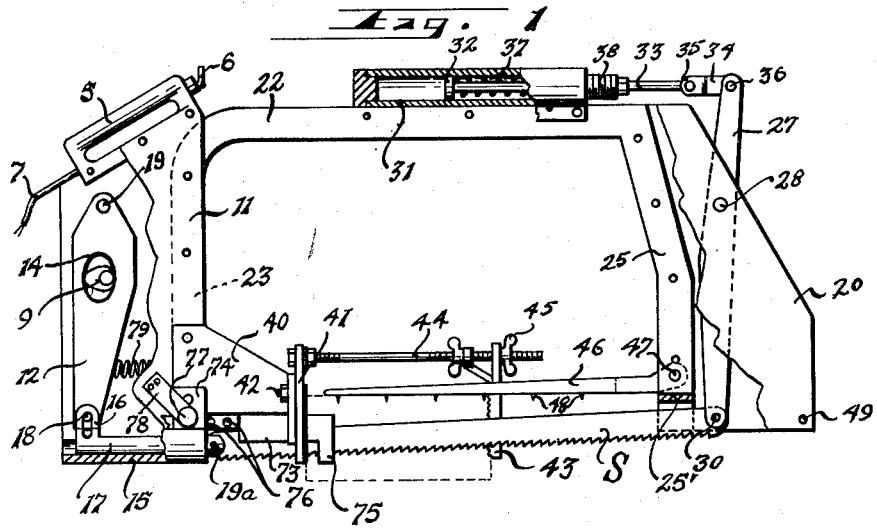
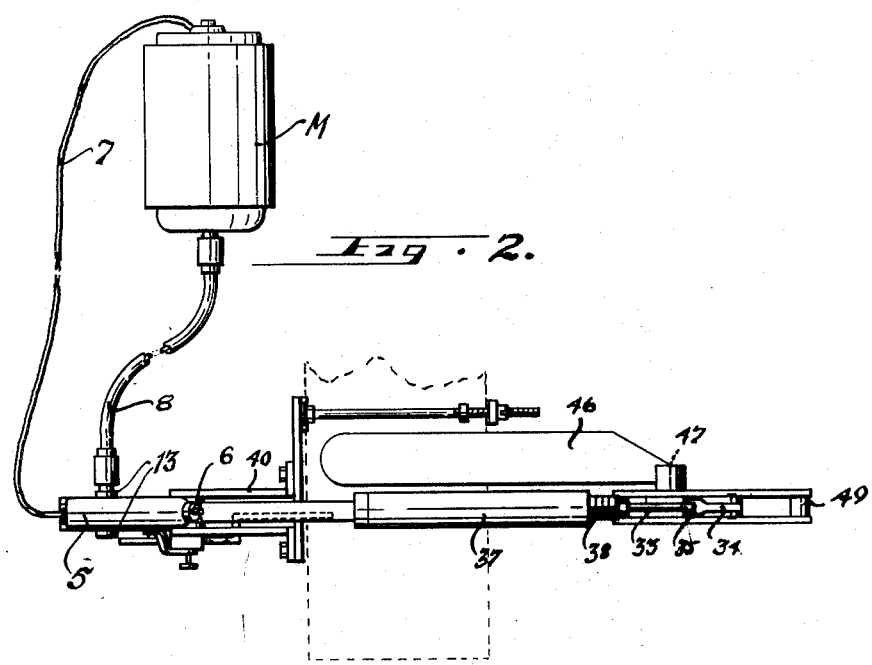
INVENTOR.
Frank Gaviola
BY and Frank Anacabe
R. M. Thomas
Attorney Sept. 2, 1952  F. GAVIOLA ET AL  2,609,015
RECIPROCATING POWER-DRIVEN SAW
Filed April 22, 1947  3 Sheets-Sheet 2
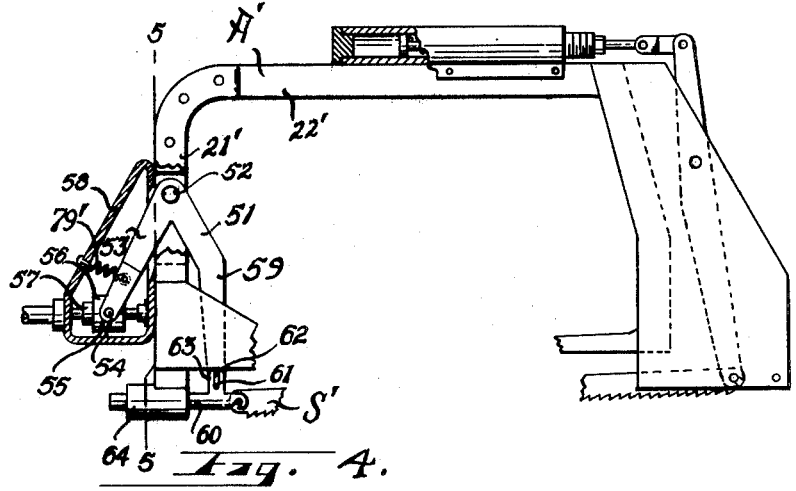
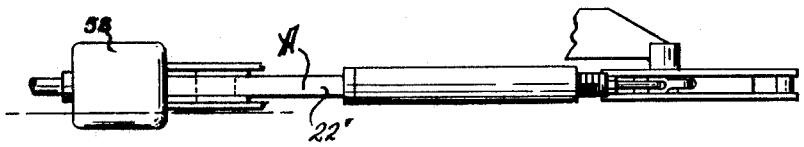
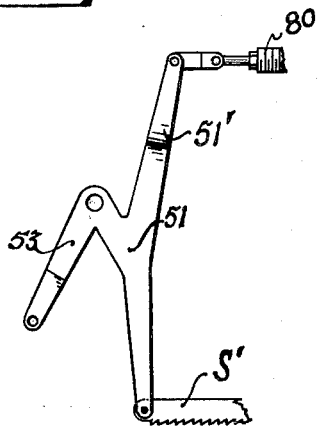
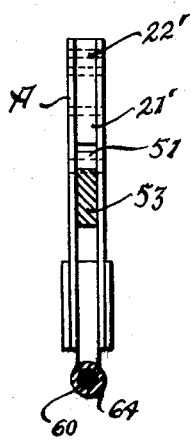
Inventor
Frank Gaviola
and
Frank Anacabe
By R. M. Thomas
Attorney Sept. 2, 1952  F. GAVIOLA ET AL  2,609,015
RECIPROCATING POWER-DRIVEN SAW
Filed April 22, 1947  3 Sheets-Sheet 3
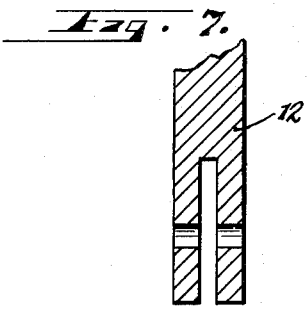
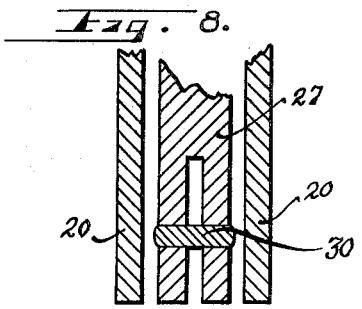
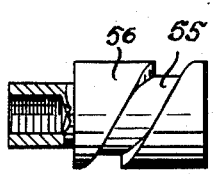
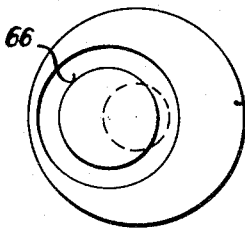
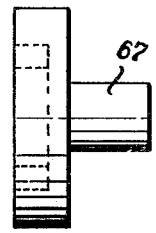
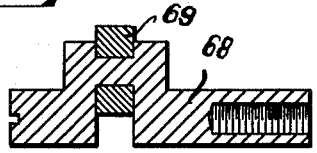
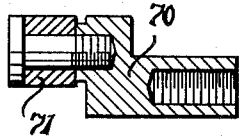
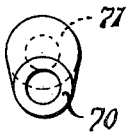
Inventor
Frank Gaviola
and
Frank Anacabe
By R. M. Thomas
Attorney Patented Sept. 2, 1952

2,609,015

UNITED STATES PATENT OFFICE 2,609,015

RECIPROCATING POWER-DRIVEN SAW

Frank Gaviola and Frank Anacabe, Elko, Nev.

Application April 22, 1947, Serial No. 743,042

3 Claims. (Cl. 143—68)

Our invention relates to improvements in power operated saws and supplements the patent filed under Serial No. 666,967, in the United States Patent Office, now Patent No. 2,498,160.

An object of the invention is to improve the cutting method by providing a rolling motion to the saw blade by means of lifting the end of the blade in its return stroke and lowering it in the cutting stroke. This effect is accomplished by attaching the saw blade directly to the lever or by inclining the axis of the saw blade supporting rod along the vertical plane. The lever and the blade supporting rods are claimed in the previous patent.

A further object is to provide a simple, light and inexpensive means for converting the rotary movement of a motor or flexible shaft to reciprocal movement for operating the blade of the hacksaw.

A still further object is to provide means to hold an object that is being cut in one place in relation to the saw blade, and to transfer the friction of the blade on the material being cut on to the hacksaw frame either directly or indirectly. In other words, to provide a self-contained structural unit when cutting.

With the foregoing and other objects in view which will appear as the description proceeds, it being noted that changes in the precise embodiment of the invention herein described may be made within the scope of what is claimed without departing from the spirit of the invention. The invention consists in the construction, combination, and arrangement of the parts herein described and claimed and illustrated in the accompanying drawings, wherein:

These objects we accomplish with the device illustrated in the accompanying drawings in which similar numerals and letters of reference indicate like parts throughout the several views and as described in the specification forming a part of this application and pointed out in the appended claims.

In the drawings, Figure 1 is a side elevation of the device, parts cut away and shown in section to illustrate parts not seen from outside.

Figure 2 is a plan view of Figure 1.

Figure 3 is a side elevation of a modified method of driving the saw, parts also cut away for clarity as in Figure 1.

Figure 4 is a plan view of Figure 3.

Figure 5 is a section on line 5—5 of Figure 3.

Figure 6 is a view of an operating arm removed from the device and shown attached directly to the saw blade without the sliding guide arm shown in Figures 1 and 3.

Figure 7 is a section of the lower end of the cam lever sectioned to show the means for attaching the lever to the saw blade.

Figure 8 is a section of the lower end of the forward end of the framework for supporting the device showing the walking beam lever to which the forward end of the saw is attached by a removable saw blade pin, which may be removed by extreme forward movement of the saw to such a position that the end of the beam lever will be beyond the framework.

Figure 9 is a side elevation of a modified type of cam race which may be used to drive the cam lever.

Figure 10 is a further modification of a cam movement which might be utilized to operate the cam lever.

Figure 11 is an edge view of Figure 10.

Figure 12 is a further modification of a cam movement for operating the cam lever, showing a double bearing type of cam.

Figure 13 is a view showing a single bearing type of cam.

Figure 14 is an end view of Figure 13.

In the drawings in which we have illustrated our invention and several modifications thereof we have shown the handle for operating and carrying the device as 5, on the top end of which an electrical switch 6 is mounted. A cable 7 extends from the switch to a motor M for operating the device and the motor M is mounted at any distance from the device and drives the cam for operating the saw blades by a flexible cable or driving shaft 8. The cam 9 is mounted in between vertical side or guard plates 11 of the framework A for the device and the cam is provided with suitable bearings 13 for holding it in true position in the framework A. A cam operated lever 12 hereafter designated as the cam lever is pivotally supported at the top end by a pin 19 inserted in and carried between the guard plates 11. The cam 9 is an eccentric body carried in an oval opening 14 in the cam lever 12 so that rotation of the cam will cause the pivoted lever to oscillate forwardly and backwardly between the side plates or guard plates 11. The bottom end of the guard plates 11 carry a guide base 15 therebetween which guide base is formed as a cylindrical guide tube or bearing with a slot through the top thereof in which the upwardly extended slotted lug 16 of the saw operating rod 17 is operated.

The rod 17 operates forwardly and backwardly in the guide base 15 and is driven by the cam lever 12 which is connected therewith by the pin 18 passing through the end of the lever and through the slot in the lug 16, the slot allowing for the straight line movement of the rod 17, but connecting the cam lever to the saw to provide the forward and backward movement of the saw blade S. The saw blade S is attached to the rod 17 by inserting it in a slot in the end of the rod 17 and attaching it thereto by a pin 19a.

Extending forward from the plates 11 there is a frame 22 which frame is made U-shaped with one leg 23 attached to and between the plates 11 by a rivet or other suitable means. The other leg 25 of the frame 22 is turned down at the forward end and plates 20 are attached to each side thereof in a manner similar to the means for attaching the plates 11 to the leg 23. A walking beam lever arm 27 is mounted between the two plates 20 by a fulcrum pin 28. The lower end of the walking beam 27 is bifurcated to receive the forward end of the saw blade S and a pin 30 is passed through the end of the lever and the perforate end of the saw to hold the saw in suspended position on the end of the lever. The pin is held in place by the two plates 20 and may be removed by moving the saw forward sufficient distance to extend it and the lower end of the walking beam beyond the plates. Bearing washers are provided on each side of the walking beam 27 on the fulcrum pin 28 to take up the friction of the pivotal point of the walking beam. A slotted guide 25' is provided at the lower end of the frame A to stabilize and clean the saw blade S.

On the top of the frame 22 a cylinder 31 is mounted, said cylinder carrying a piston 32 on the end of the rod 33. A bifurcated link 34 connects the forward end of the rod 33 with the top end of the walking beam 27 by pins 35 and 36. A spring 37 is carried within the cylinder 31 between the piston 32 and a bushing nut 38. The nut 38 is externally threaded to screw into the end of the cylinder 31 to provide for adjusting the tension of the spring 37. The link 34 converts rectilinear movement of the rod 33 to curvilinear movement of the walking beam 27, whereby the spring tension of the spring 32 is transmitted to the saw blade S normally biasing said blade to downward and backward position. The position of the pivot 28 of the walking beam 27 places the saw blade S on an inclined angle so that as the saw is drawn back for cutting it is lowered into the work and the forward movement of the saw blade raises it from the work.

Attached to the plates 11 we provide forwardly extended guide plates 40 which plates have their forward ends extended at right angles to support a slidable face plate 41. The face plate is attached to the plates 40 by adjustment bolts 42. An adjustable clamp 43 is carried on the end of a support rod 44 which rod is secured to the face plate 41. The clamp 43 is adjustable on the rod by a wing nut 45. A restraining member 46 is attached pivotally to the leg 25 by the pin or adjusting bolt 47. The lower surface of the member 46 is formed with downwardly extended teeth 48, or other suitable sharpened points which are adapted to engage the work being cut and hold it in alignment with the saw blade S. A spacer 49 is placed between the two plates 20 at the lower corner thereof to hold them in spaced relationship and prevent their binding the lower end of the walking beam.

In Figure 3 of the drawings, I have shown a modified means for operating the saw which consists of an inverted V-shaped cam lever 51, which lever is pivoted to the leg 21' of the U-shaped frame 22' of the framework A' by a pin 52. The leg 53 of the lever 51 is provided with a cam pin 54 which pin engages in a cam race 55 in the cam 56. The cam 56 is mounted on and rotated by a shaft 57, which in turn is driven by any suitable source of power, such as the flexible shaft shown in Figures 1 and 2. A casing 58 encloses the cam in the rear end of the lever 51.

The leg 59 of the lever 51 is extended down to and engaged with the operating rod 60 by the pin 61 in the slot 62 of the up-turned boss 63 which is attached to or formed as an integral part of the rod 60. A guide cylinder 64 is attached to the bottom end of the leg 21 at a slight angle so that the rod 60 is inclined upwardly on the end to which the saw blade S' is attached.

The rest of the device is substantially identical to that shown in Figures 1 and 2.

In Figure 6 of the drawings, the lever 51 is shown attached directly to the saw blade S' and it will be obvious that the cam lever 12 may also be attached directly to the saw blade if so desired.

Figure 9 illustrates the method of constructing a cam 56, showing the race 55 cut therein.

Figures 10 and 11 show another modification of a cam which may be employed for the same purpose as the cam 56 and which consists of a cam plate 65 in which a race 66 is formed, in which race the cam pin 54 may operate. The boss 67 extended from the back side of the plate 65 is provided as a bearing support for the cam plate and also as a means of attaching the flexible cable 8 thereto.

In Figure 12 I have shown a crank shaft 68 carrying an eccentric roller 69 thereon and which crank and roller may be substituted for the eccentric or cam 9 of Figure 1.

Figure 13 illustrates a half crank 70 carrying a cam roller 71 thereon which may also be utilized for the same purpose as that of the cam 9.

A slidable holding plate 73 is carried in a bracket 74 on the side of the plate 11. The forward end 75 of the plate is adapted to be engaged against the work being cut to hold it from slipping and to guide the work in relation to the saw. Indentations or catch holes 76 are formed in the outside surface of the plate 73 and a pin 77 is provided in the plate 11 with the end of the pin adapted to engage in any of the holes 76 desired. A retaining spring 78 normally holds the pin 77 in position in one of the holes 76.

Reaction springs 79 and 79' may be employed by the lever 12 and the frame and between the lever 53 and its respective frame to assist the driving mechanism of the saw for balancing the tension spring 37 on the non-cutting stroke of the saw blades S and S'. Springs 79 and 79' assist the driving mechanism of the saw on the cutting stroke and balance the tension spring 37 on the non-cutting stroke of the saw blades S and S'.

As shown in Figure 6, it is obvious that levers 12 or 51 may be extended upward as shown at 51' like lever 27 and connected to a turnbuckle 80 and then to a tension spring or to the spring 37 in a similar manner. By this arrangement a continuously even tension will be maintained at each end of the saw blades S and S'. Tension adjustment may be provided by turnbuckle 80.

The operation of the device is as follows:

The cam 9 is rotated by any electric motor or other source of power such as the flexible shaft 8 and the contour and eccentricity of the cam converts the rotational force and power to a variable rectilinear reciprocal movement of the saw blade. The lever 27 to which the saw blade S is attached lifts or lowers the adjacent end of the saw blade and thereby assures an efficient cutting stroke. The tension spring 37 and its component parts cooperating therewith provide the minimum of obstruction and the highest efficiency. The mechanical reciprocation of the blade enables the user to cut wood, metals, meats, or materials with little expenditure of energy.

While the above described structure is what we at the present time consider to be the best solution and embodiment of our invention, we wish it understood that the construction is merely illustrative and any minor changes of detail in fabrication may be resorted to without departing from the spirit of the invention or the scope of the appended claims.

Having thus described our invention, we claim:

1. In a power driven saw, in combination, a U-shaped frame including a pair of side plates, a lever pivotally mounted at one end of said frame, a second lever having a separate pivotal mounting at the other end of said frame, a saw blade connected at one end directly to said first lever, a rod connecting the other end of said saw blade to said second lever, said saw blade extending across the open side of said frame, a rotatable power driven cam means secured between said side plates, said first mentioned lever having an aperture therein coacting with said cam to provide a reciprocatory motion to said one end of said blade, and said second lever imparting a rocking motion to said other end of said blade.

2. In a power driven saw, in combination, a U-shaped frame including a pair of side plates, a lever pivotally mounted at one end of said frame, a second lever having a separate pivotal mounting at the other end of said frame, a saw blade connected at one end directly to said first lever, a rod connecting the other end of said saw blade to said second lever, said saw blade extending across the open side of said frame, a rotatable power driven cam means secured between said side plates, said first mentioned lever having an aperture therein coacting with said cam to provide a reciprocatory motion to said one end of said blade, and spring means carried by said frame normally biasing said second lever to move said blade to upward and backward position.

3. In a power driven saw, in combination, a U-shaped frame including a pair of side plates, a lever pivotally mounted at one end of said frame, a second lever having a separate pivotal mounting at the other end of said frame, a saw blade connected at one end directly to said first lever, a rod connecting the other end of said saw blade to said second lever, said saw blade extending across the open side of said frame, a rotatable power driven cam means secured between said side plates, said first mentioned lever having an aperture therein coacting with said cam to provide a reciprocatory motion to said one end of said blade, and spring means carried by said frame normally biasing said second lever to move said blade to upward and backward position, said means including a piston secured to the end of said second lever opposite said blade and carried by said frame containing said piston, said spring bearing against said piston to bias the same inwardly of said cylinder.

FRANK GAVIOLA.
FRANK ANACABE.

REFERENCES CITED

The following references are of record in the file of this patent:

UNITED STATES PATENTS

| Number | Name | Date |
| --- | --- | --- |
| 160,768 | Hale | Mar. 16, 1875 |
| 189,461 | House | Apr. 10, 1877 |
| 524,644 | Morrell | Aug. 14, 1894 |
| 1,230,991 | Briggs | June 26, 1917 |
| 1,498,135 | Uden | June 17, 1924 |
| 1,775,692 | Plut | Sept. 16, 1930 |
| 1,835,432 | Samson | Dec. 8, 1931 |
| 2,143,757 | Brazeale | Jan. 10, 1939 |